(12) United States Patent
Shah et al.

(10) Patent No.: US 8,838,509 B1
(45) Date of Patent: Sep. 16, 2014

(54) SITE FLOW OPTIMIZATION

(71) Applicant: LinkedIn Corporation, Mountain View, CA (US)

(72) Inventors: Samir M. Shah, San Francisco, CA (US); Lili Wu, Palo Alto, CA (US); Manas Khadilkar, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/056,777

(22) Filed: Oct. 17, 2013

(51) Int. Cl.
*G06F 15/18* (2006.01)
*G06N 99/00* (2010.01)
*G06N 5/02* (2006.01)

(52) U.S. Cl.
CPC ............ *G06N 5/02* (2013.01); *G06N 99/005* (2013.01)
USPC .......................................................... 706/12

(58) Field of Classification Search
CPC ............ G06N 3/00; G06N 5/00; G06N 7/00; G06N 9/00; G06N 5/04; H04L 67/22; H04L 67/327; H04L 41/142; G06Q 30/02
See application file for complete search history.

(56) References Cited

U.S. PATENT DOCUMENTS

| | | | |
|---|---|---|---|
| 2003/0039212 A1* | 2/2003 | Lloyd et al. | 370/235 |
| 2003/0140023 A1* | 7/2003 | Ferguson et al. | 706/21 |
| 2003/0149603 A1* | 8/2003 | Ferguson et al. | 705/7 |
| 2007/0169165 A1* | 7/2007 | Crull et al. | 725/135 |
| 2011/0196690 A1* | 8/2011 | Peles et al. | 705/1.1 |
| 2011/0258041 A1* | 10/2011 | Ioffe et al. | 705/14.46 |
| 2011/0320423 A1* | 12/2011 | Gemmell et al. | 707/706 |
| 2012/0185310 A1* | 7/2012 | Greenspun | 705/14.12 |
| 2012/0185328 A1* | 7/2012 | Audenaert et al. | 705/14.46 |
| 2012/0209795 A1* | 8/2012 | Glickman | 706/12 |
| 2013/0306276 A1* | 11/2013 | Duchesneau | 165/104.21 |

OTHER PUBLICATIONS

David Hartstein, "Using the Landing Pages Report in Google Analytics", Oct. 10, 2010, pp. 1-5. (website: http://wiredimpact.com/blog/landing-pages-report-google-analytics/).*
Google, "Introducting Flow Visualization: Visualizing Visitor Flow", Oct. 19, 2011, pp. 1-5.*

* cited by examiner

*Primary Examiner* — Jeffrey A Gaffin
*Assistant Examiner* — Paulinho E Smith
(74) *Attorney, Agent, or Firm* — Schwegman Lundberg & Woessner, P.A.

(57) ABSTRACT

A method and system to present an optimum action in response to a flow of actions in a computer network from a user are provided. For each of a plurality of possible presented actions corresponding to a particular flow of actions in a computer network, and for each of one or more possible performed actions for each possible presented action, a likelihood that a user will perform the possible performed action is determined. Then each of the determined likelihoods is weighted by applying a weight assigned to a corresponding possible presented action. An optimum presented action is identified determining a presented action having a weighted maximum determined likelihood, based on the weighted determined likelihood.

14 Claims, 9 Drawing Sheets

SITE FLOW OPTIMIZATION

TECHNICAL FIELD

This application relates to the technical fields of software and/or hardware technology and, in one example embodiment, to site flow optimization.

BACKGROUND

An on-line social network may be viewed as a platform to connect people in virtual space. An on-line social network may be a web-based platform such as, for example, a social networking web site, and may be accessed by a user via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages. A member's profile web page of a social networking web site may emphasize employment history and education of the associated member.

BRIEF DESCRIPTION OF DRAWINGS

Embodiments are illustrated by way of example and not limitation in the figures of the accompanying drawings, in which like reference numbers indicate similar elements and in which:

FIG. 1 is a screen capture illustrating an example of a profile page, in accordance with an example embodiment.

FIG. 8 is a screen capture of an example landing page presented in response to a determination of an optimum landing page to present, in accordance with an example embodiment.

DETAILED DESCRIPTION

A method and system to improve site flow optimization in a social network are described. In the following description, for purposes of explanation, numerous specific details are set forth in order to provide a thorough understanding of an embodiment of the present disclosure. However, it will be evident to one skilled in the art that the present disclosure may be practiced without these specific details.

As used herein, the term "or" may be construed in either an inclusive or exclusive sense. Similarly, the term "exemplary" merely means an example of something or an exemplar and not necessarily a preferred or ideal means of accomplishing a goal. For the purposes of this description, the phrase "an on-line social networking application" may be referred to as and used interchangeably with the phrase "an on-line social network" or merely "a social network." It will also be noted that an on-line social network may be any type of an on-line social network such as, for example, a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources such as, for example, publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Reputation scores may be computed based on information obtained from trusted sources, such as patent databases, publications databases, skills, endorsement of skills, or even enterprise contracts.

Figure 1:
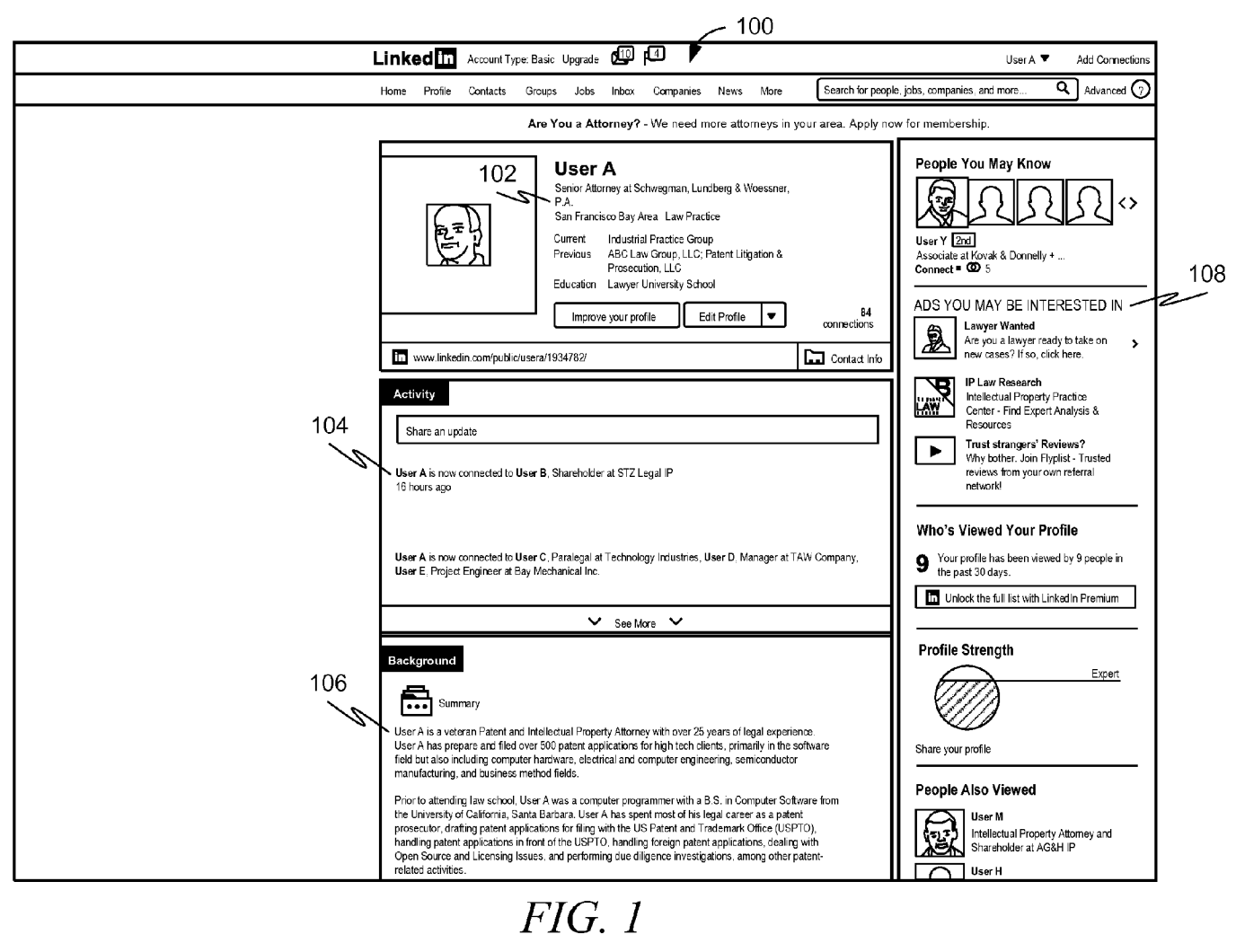

FIG. 1 is a screen capture illustrating an example of a member profile page 100, in accordance with an example embodiment. As can be seen, the member profile page 100 includes a brief summary 102 of a member of a social network, an activity feed 104 for activity updates related to the member, a background 106 of the member, and a sidebar 108 indicating other potential areas in the social network to visit.

Figure 2:
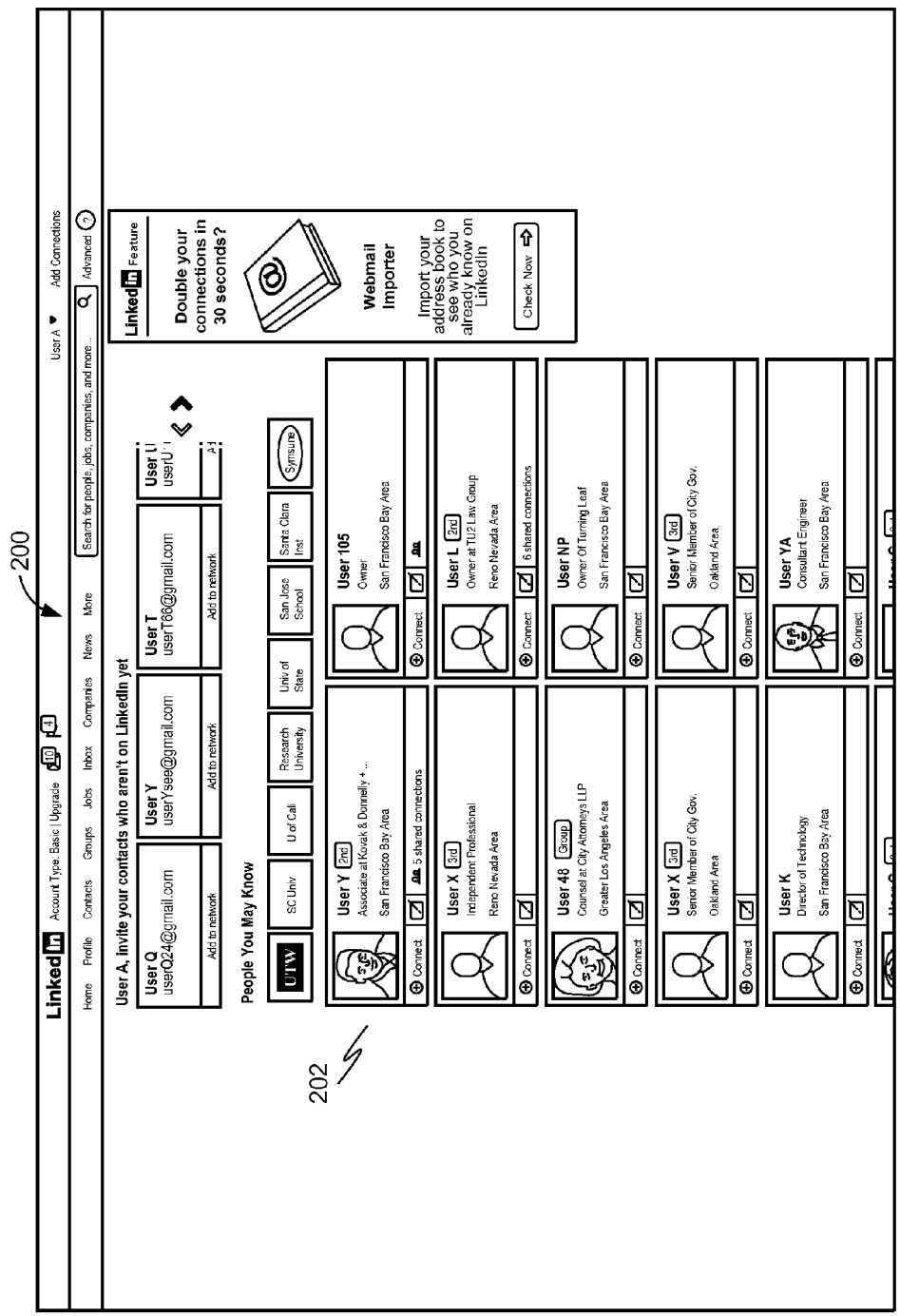
FIG. 2 is a screen capture illustrating an example of a PYMK (People You May Know) page, in accordance with an example embodiment.

While a member profile page 100 is one location within a social network site that a user may visit, there may be other locations, either related or unrelated to the member profile page 100. For example, one popular page may be a "people you may know" (PYMK) page. FIG. 2 is a screen capture illustrating an example of a PYMK page 200, in accordance with an example embodiment. As can be seen, the PYMK page 200 includes one or more identifications 202 of additional members of the social network site that the current member may wish to add to his or her social network. This may include, for example, second and third degree social network relations (e.g., a person who is linked to a member to which the current member is linked).

Figure 3:
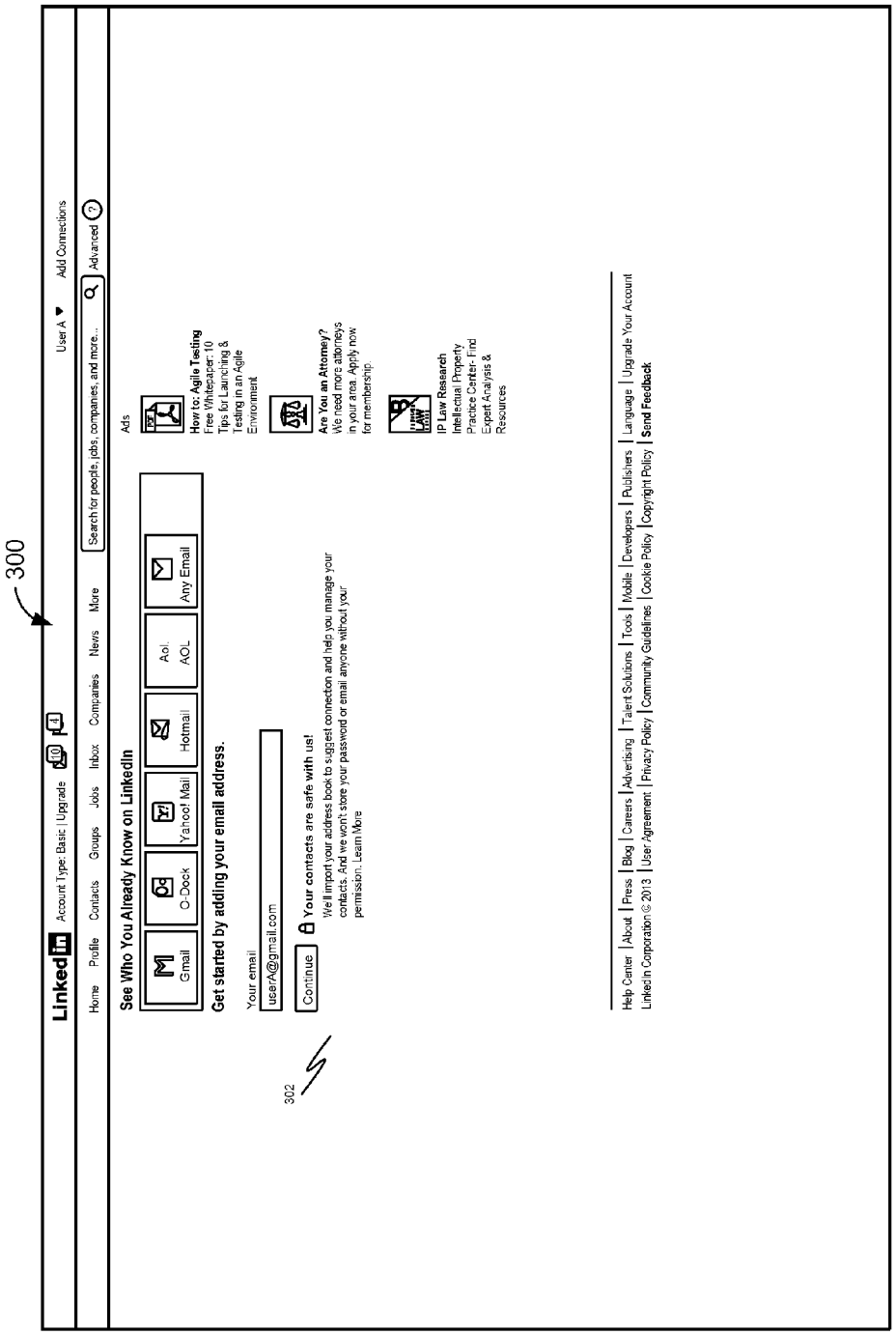
FIG. 3 is a screen capture illustrating an example of an address book importing page, in accordance with an example embodiment.

Another example of a location commonly frequented within a social network site is an address book importing page. FIG. 3 is a screen capture illustrating an example of an address book importing page 300, in accordance with an example embodiment. Here, the member is prompted to enter an email address 302, which automatically retrieves contacts from an address book linked to the email address.

Figure 4:
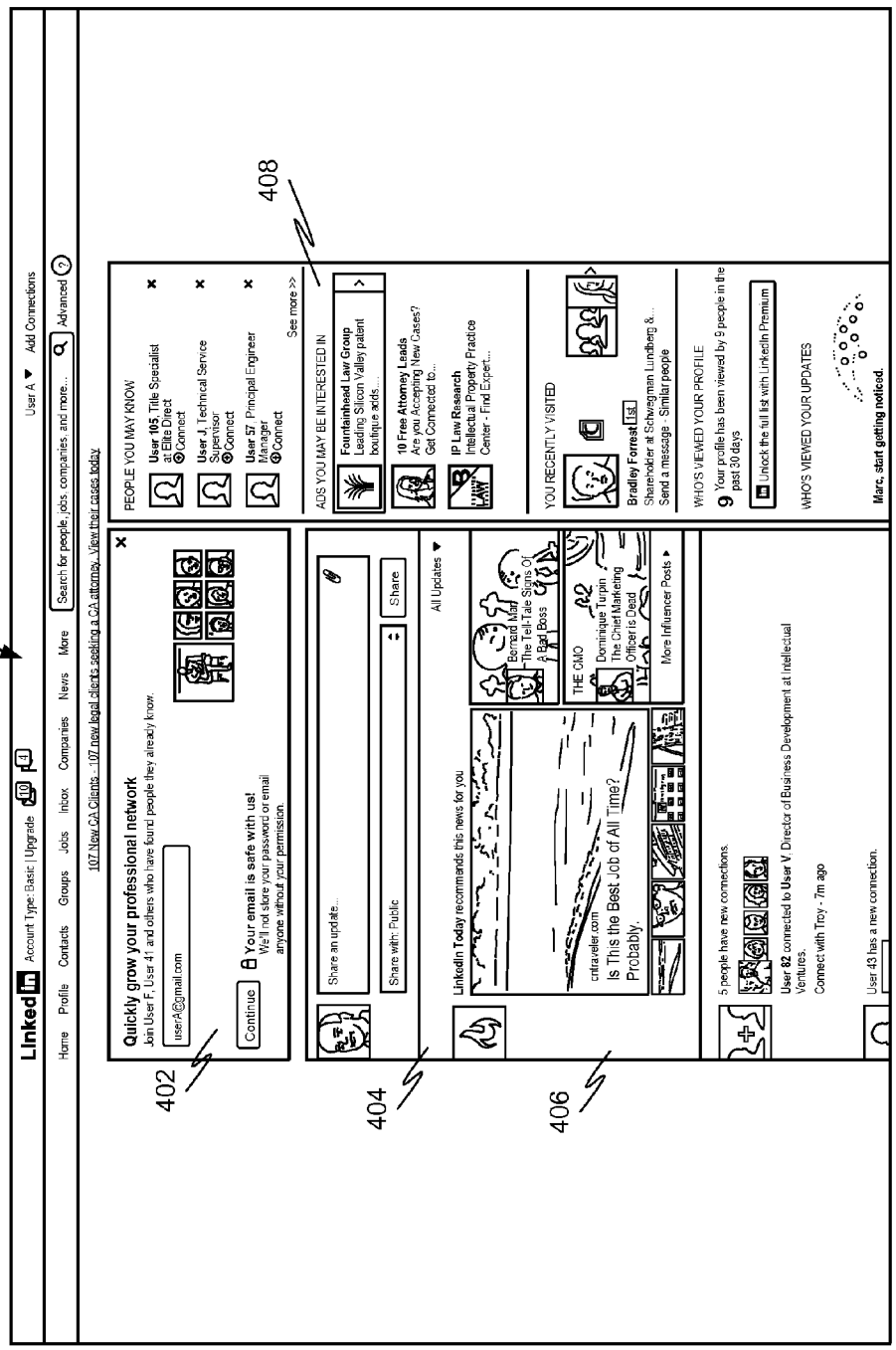
FIG. 4 is a screen capture illustrating an example of a home page in a social network site, in accordance with an example embodiment.

Another example of a location commonly frequented within a social network site is a home page. FIG. 4 is a screen capture illustrating an example of a home page 400 in a social network site, in accordance with an example embodiment.

Here, the home page 400 may contain various elements that may have been present on one or more of the pages described earlier, such as an address book import area 402, a status update area 404, an activity feed 406, and a sidebar 408.

There are a number of actions within a social network that, after they are performed, cause the system to direct or redirect a user to a page within the social network site. For example, if a user receives an invitation from another user to link to the other user (to be added to each others' social networks, for example) and the user accepts this invitation, it is common for the user's web browser or other application to be provided a confirmation of the addition to the other user's social network as well as to be redirected to a location (e.g., web page) within the social network site. Commonly, the social network site will control to which location the user is redirected. For example, an address book importing page may be the most valuable to the social network site (in terms of adding new users) and, thus, the social network site may be configured so that users invitations to link are redirected to their address books (where the confirmation of the addition to the social network is provided along with typical address book functions) upon accepting. However, a problem may be encountered in that certain users may not respond in the same way when sent to one location as opposed to another location. For example, an address book importing page may be the most valuable generically to the social network site and, thus, typically be the location to which users are redirected; however, a larger number of users may drop off (e.g., stop browsing for that session) at the address book importing page than they would at another page (e.g., the PYMK page).

In an example embodiment, the system uses machine-learning models to identify an optimum page to which a user is to be redirected. The likelihood that a user is to perform a set of actions on each candidate web page is determined, and a business value is assigned to each particular action. From this, the system can redirect the user to the most optimum page for the social network site. Additionally, this has the effect of maximizing both business value and user engagement.

As an example, there may be a 50% chance that the user will invite an additional user while on the PYMK page and only a 10% chance that the user will upload their address book while on the address book importing page. However, the uploading of the address book may be an action that is 10 times more valuable to the social network site than the action of inviting an additional user. In such a case, a calculation is made and it is ultimately determined that the user should be redirected to the address book importing page upon accepting an invitation.

Figure 5:
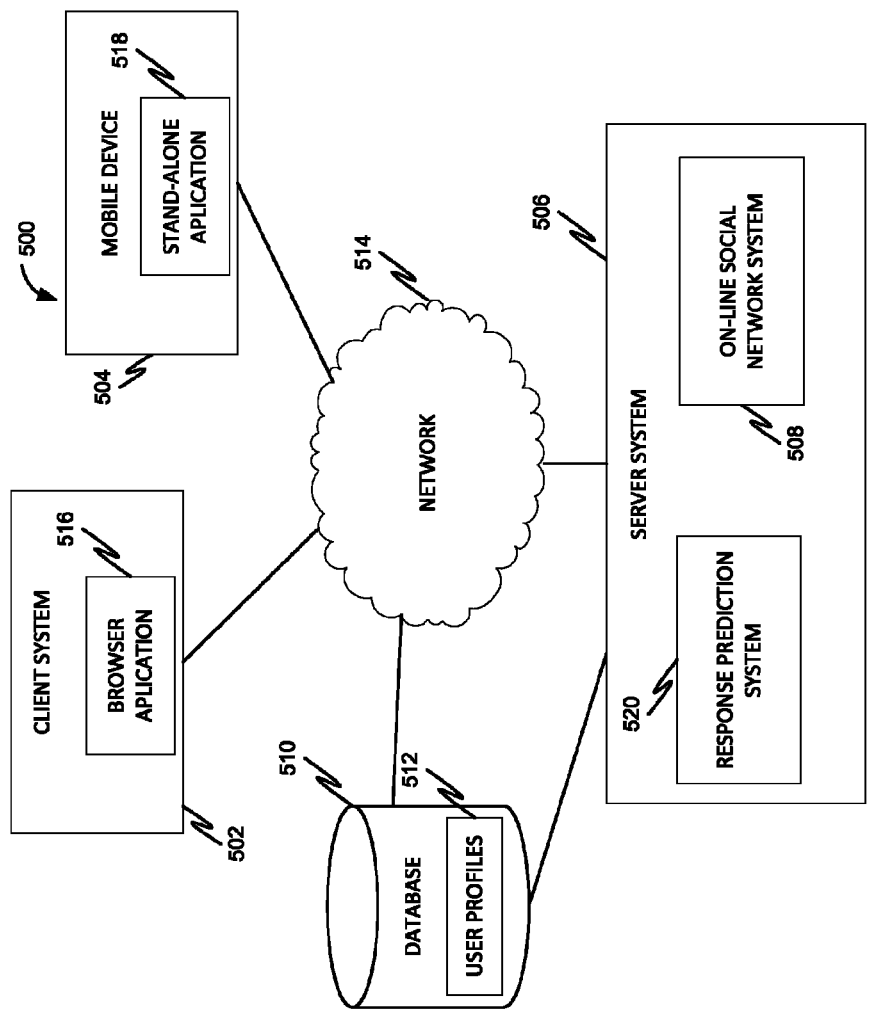
FIG. 5 is a system diagram illustrating a network environment, in accordance with an example embodiment.

An example method and system for determining a response to an action in a social network may be implemented in the context of a network environment 500 illustrated in FIG. 5. As shown in FIG. 5, the network environment 500 may include client systems 502 and 504, with client system 504 being a mobile device. The network environment 500 also includes a server system 506. In one example embodiment, the server system 506 may host an on-line social network system 508. Each member of an on-line social network is represented by a member profile that contains personal and professional information about the member and that may be associated with social links that indicate the member's connection to other member profiles in the on-line social network. Member profiles and related information may be stored in a database 510 as user profiles 512.

The client system 502 and mobile device 504 may be permitted to access the server system 506 via a communications network 514, utilizing, for example, a browser application 516 executing on the client system 502, or a stand-alone application 518 executing on the mobile device 504. The communications network 514 may be a public network (e.g., the Internet, a mobile communication network, or any other network capable of communicating digital data). As shown in FIG. 5, the server system 506 also hosts a response prediction system 520. In one example embodiment, the response prediction system 520 is configured to determine an appropriate response to a particular action.

In an example embodiment, various factors are used to determine the likelihood of certain user responses after certain actions have occurred. This may be represented by the vector (w, x, y, z), where w represents the user, x represents the flow (the sequence of actions that led to the redirection, such as receiving an invitation and clicking accept), y represents the particular location being predicted (e.g., the address book importing page), and z represents a possible action that can be performed from the location y (e.g., sending an invitation, navigating to another location, dropping the session, etc.). The prediction function may, therefore, be represented as P(w, x, y, z), which represents the likelihood that the user w, through flow x, will arrive at location y, will perform action z.

The system may calculate the predicted likelihoods for various vector combinations. In an example embodiment, these likelihoods may be weighted based on one or more factors, which will be described in more detail below. This weight may be represented as U (z), which indicates a weight specific for action z. Then, for a w having a flow x, the system may determine the location y having the highest combination of predicted response rate and business value, as represented by the formula argmax (P (w, x, y, z)*U (z)).

It should be noted that while this disclosure often describes the decision to select a particular location or web page within a social network for redirection, it is possible to extend the concepts described herein to other types of presented actions. For purposes of this disclosure, the term "presented action" will be any action performed by the system that presents something to a user. In the primary example described in this disclosure, the presented action is the redirection of a user web browser or application to a particular location within the social network. However, other types of presented actions are possible as well, such as placing objects on a current web page or presenting an overlay on a display. Another example is selecting certain objects/modules to display, and selecting an ordering/location for the objects/modules to be displayed. In such cases, the prediction is used to determine the optimum presented action to use in order to maximize the possibility of action z (which may also be referred to as a performed action) occurring.

Thus, in an example embodiment, the presented action may be a location within a social network to which the user is redirected and the possible performed actions may include inviting another user, updating a user profile, uploading an address book, reading a digest, reading elements of a side bar, and sending a message.

Figure 6:
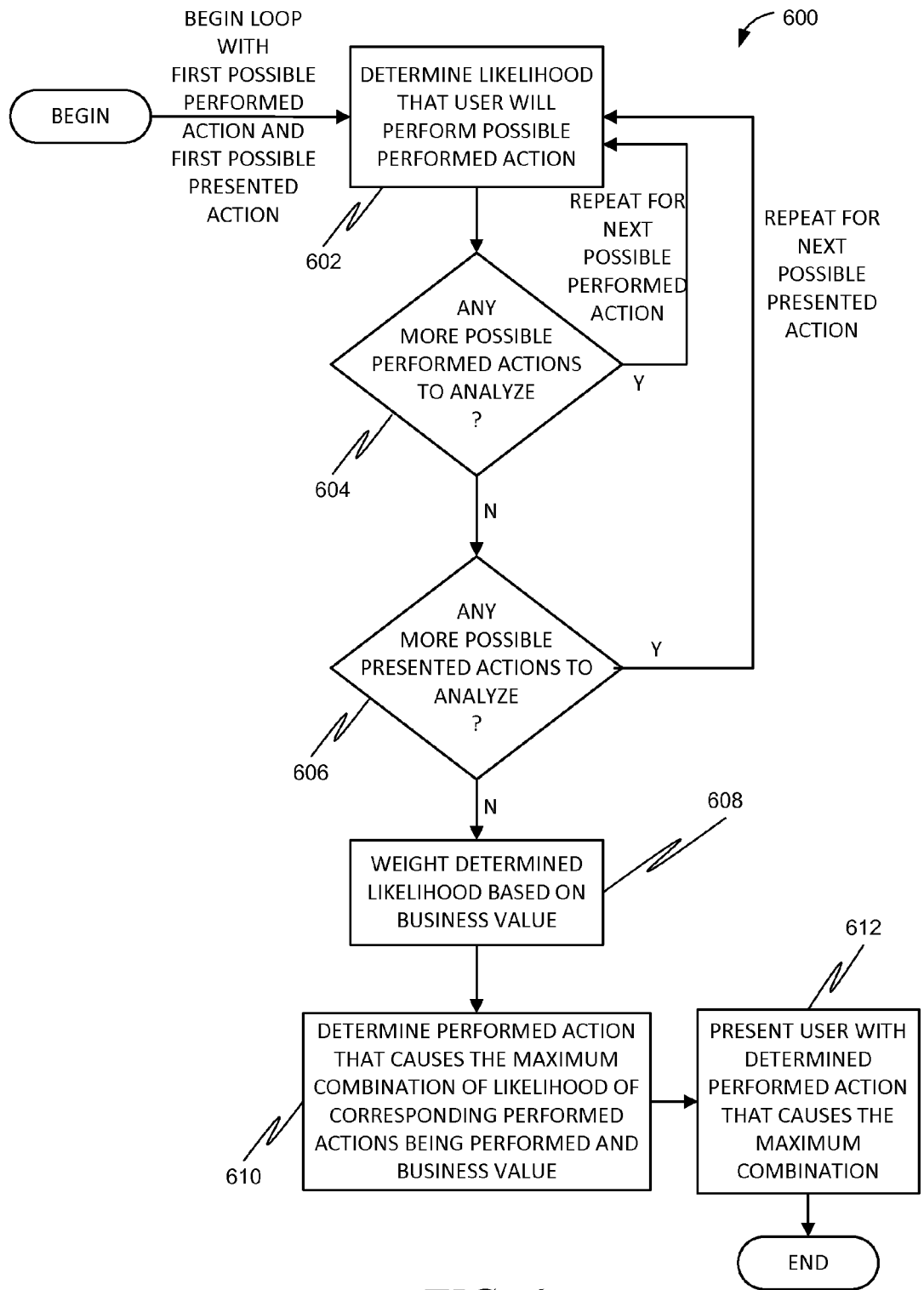
FIG. 6 is a flow diagram illustrating a method, in accordance with an example embodiment, of selecting an optimum presented action.

FIG. 6 is a flow diagram illustrating a method 600, in accordance with an example embodiment, of selecting an optimum presented action. The method 600 may be performed by a server for a social network site. The server may be a server hosting some or all of the social network site, or may simply be a server that has some sort of connection to the social network site. It should be noted that in some embodiments one or more client devices may be used, either in lieu of or in conjunction with, the server, in order to perform the method 600.

A first loop is begun for a first of a plurality of possible presented actions corresponding to a particular flow. A second loop is also begun for a first of one or more possible performed actions for each possible presented action. At operation 602, a likelihood that a user will perform the possible performed action is determined. At operation 604, it is determined if there are any more possible performed actions to analyze for the possible presented action. If so, then operation 602 is repeated for the next possible performed action. If not, then at operation 606, it is determined if there are any more possible presented actions to analyze. If so, then operation 602 is repeated for the next possible presented action.

It should be noted that it is not necessary to analyze every single possible performed action and presented action. Rather, a designer could choose only to analyze certain performed actions and certain presented actions and, as such, operations 604 and 606 are designed to allow such flexibility.

At operation 608, the determined likelihoods are weighted based on a business value of each corresponding possible performed action. This might include, for example, multiplying each determined likelihood by a weighting factor assigned to the each corresponding possible performed action.

At operation 610, the performed action that causes the maximum combination of likelihood of corresponding performed actions being performed by the user when presented with the presented action for the particular flow and business value is determined.

At operation 612, when the particular user encounters the particular flow, the user is presented with the determined performed action that causes the maximum combination as determined by operation 610.

Figure 7:
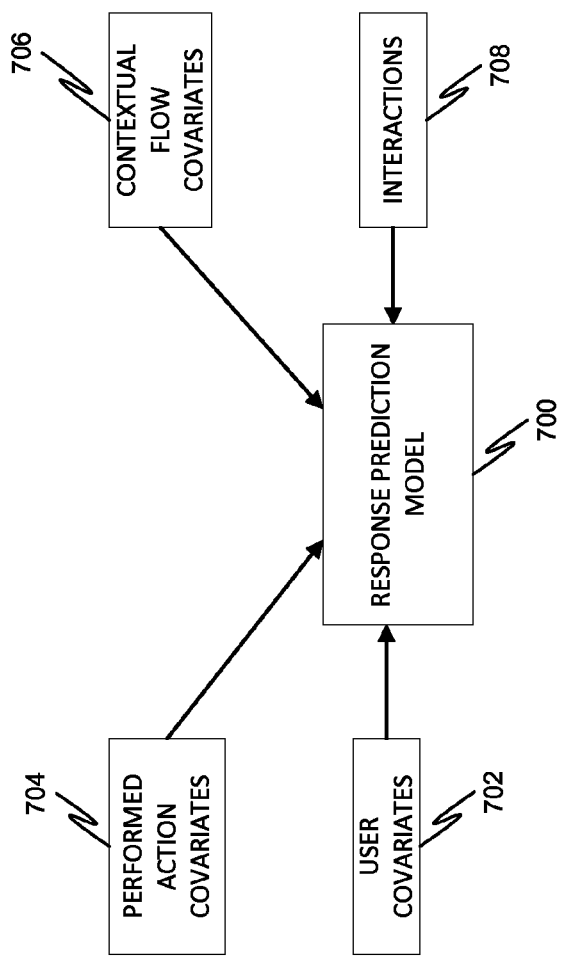
FIG. 7 is a diagram illustrating inputs to a response prediction model, in accordance with an example embodiment.

The determination of likelihood of various possible performed actions from operation 602 may utilize a machine-learning model to compute the predicted likelihoods. This may include retrieving various features, also known as covariates, which may help to better predict how a particular user will act when presented with a particular presented action in response to a flow. FIG. 7 is a diagram illustrating inputs to a response prediction model, in accordance with an example embodiment. Here, the response prediction model 700 may receive inputs as to user covariates 702, performed action covariates 704, contextual flow covariates 706, and interactions 708. User covariates 702 may include demographic information (e.g., age, sex), behavioral information (past behavior in the social network), and other information (e.g., non-demographic information from a user profile, such as interests, schooling, prior jobs, etc.). Performed action covariates 704 may include items of information specific to the performed action. For example, if the performed action is the redirection of a user to a particular web page in the social network, the performed action covariates 704 may include page-specific information such as typical response rate for the page, page layout, etc. Contextual flow covariates 706 include information about the flow being analyzed, such as a tracking code, time, page key, etc. Interactions 708 include multidimensional mappings of various combinations of the other covariates 702-706. For example, there may be an interaction showing interaction between a user covariate 702 and a page covariate.

Overall, in an example embodiment, there may be tens to hundreds of millions of observations and hundreds of thousands to millions of covariates that can be used for analysis. The covariates can be retrieved from any number of different sources, both inside and outside the social network. For example, other web services may be partnered with to obtain covariates about the same user as performed on the different web services.

It should also be noted that while various covariates have been described above, the disclosure is not limited to these specific covariates or even the types of covariates explicitly mentioned. There may be any number of other covariates available now, or in the future, that could be analyzed to help with the prediction. This might include, for example, mobile tracking data, offsite data, social data, context information, etc.

In an example embodiment, an API may be provided that allows functions or applications to make a call to the system to determine the most optimal presented action. For instances where the presented action is a page in a social network site to which to redirect the user, this API essentially performs the analysis described above and returns the location with the maximum combination of predicted performed action and business value. In other words, the API takes as input a member identification, possible pages to redirect the user, and flow, and returns the optimum page to which to redirect the user. In this example embodiment, there is no need to specify to the API the list of possible performed actions for each page, because the system is already aware of these.

Example API calls may look like the following:
getOptimalPage(memberId=1213,
   pages={PYMK_LANDING, ADD_CONNECTIONS},
   context=INVITE_ACCEPT)
   => PYMK_LANDING
getOptimalPage(memberId=1213,
   pages={HOMEPAGE, PROFILE}) //No flow defn
   => HOMEPAGE
getOptimalPage(memberId=1213,
   pages={HOMEPAGE, PYMK_LANDING},
   action=FOLLOW,
   useBusinessUtility=false)
   => HOMEPAGE In another example embodiment, a system administrator may be able to dynamically alter the weights assigned to various performed actions based on various factors at runtime. This would allow, for example, an executive to deem that new user signups are of predominant importance for the social network and then switch gears and have the executive deem that maximizing communications between members are of predominant importance, and have the recommended pages be automatically updated when the weights correspondingly change.

Figure 8:
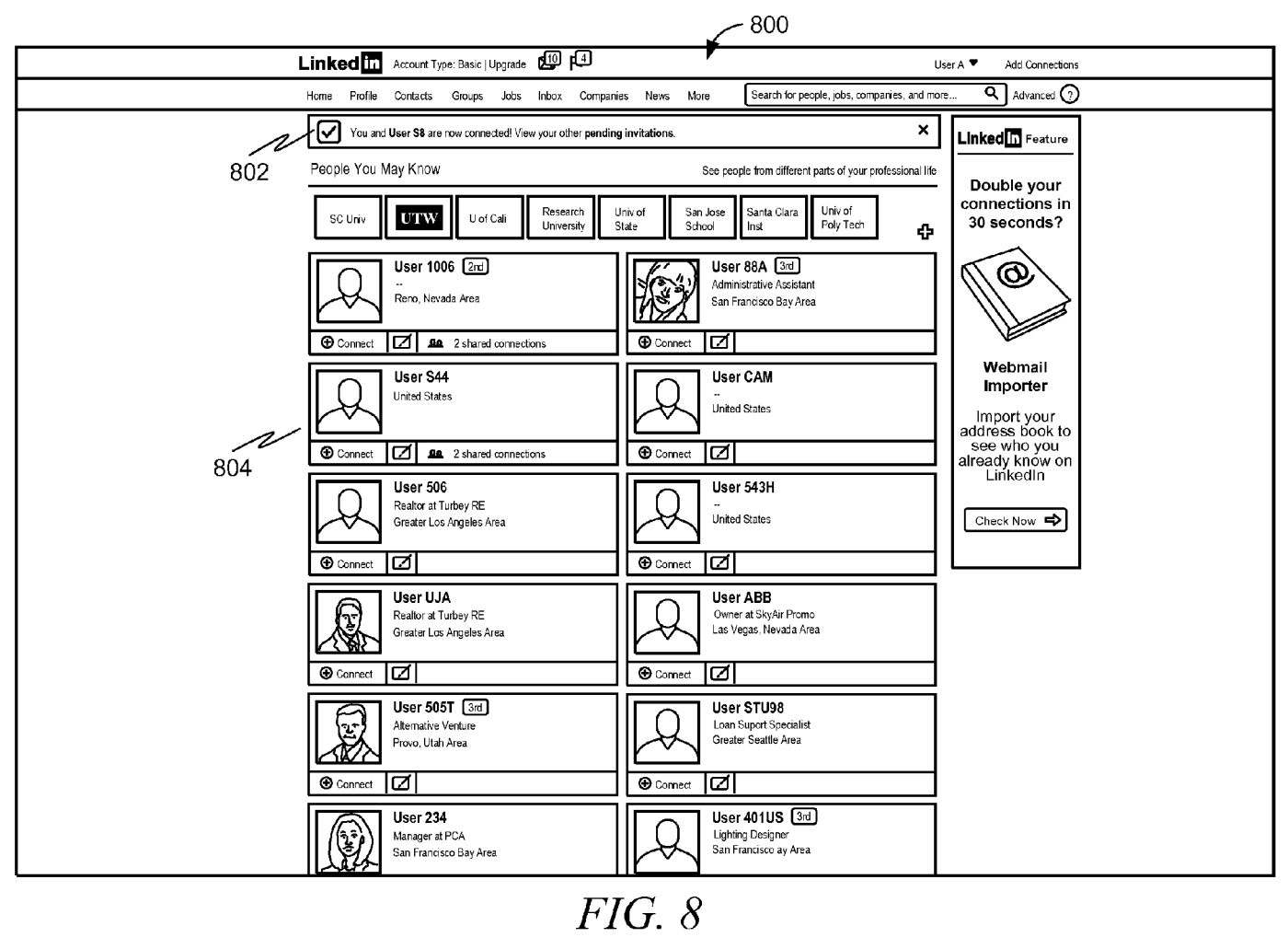

FIG. 8 is a screen capture of an example landing page 800 presented in response to a determination of an optimum landing page to present, in accordance with an example embodiment. Here, after the user has accepted an invitation, he or she is presented with a page that is a hybrid of a confirmation 802 of the accepted information and the determined optimum landing page 804 (here a PYMK page).

Figure 9:
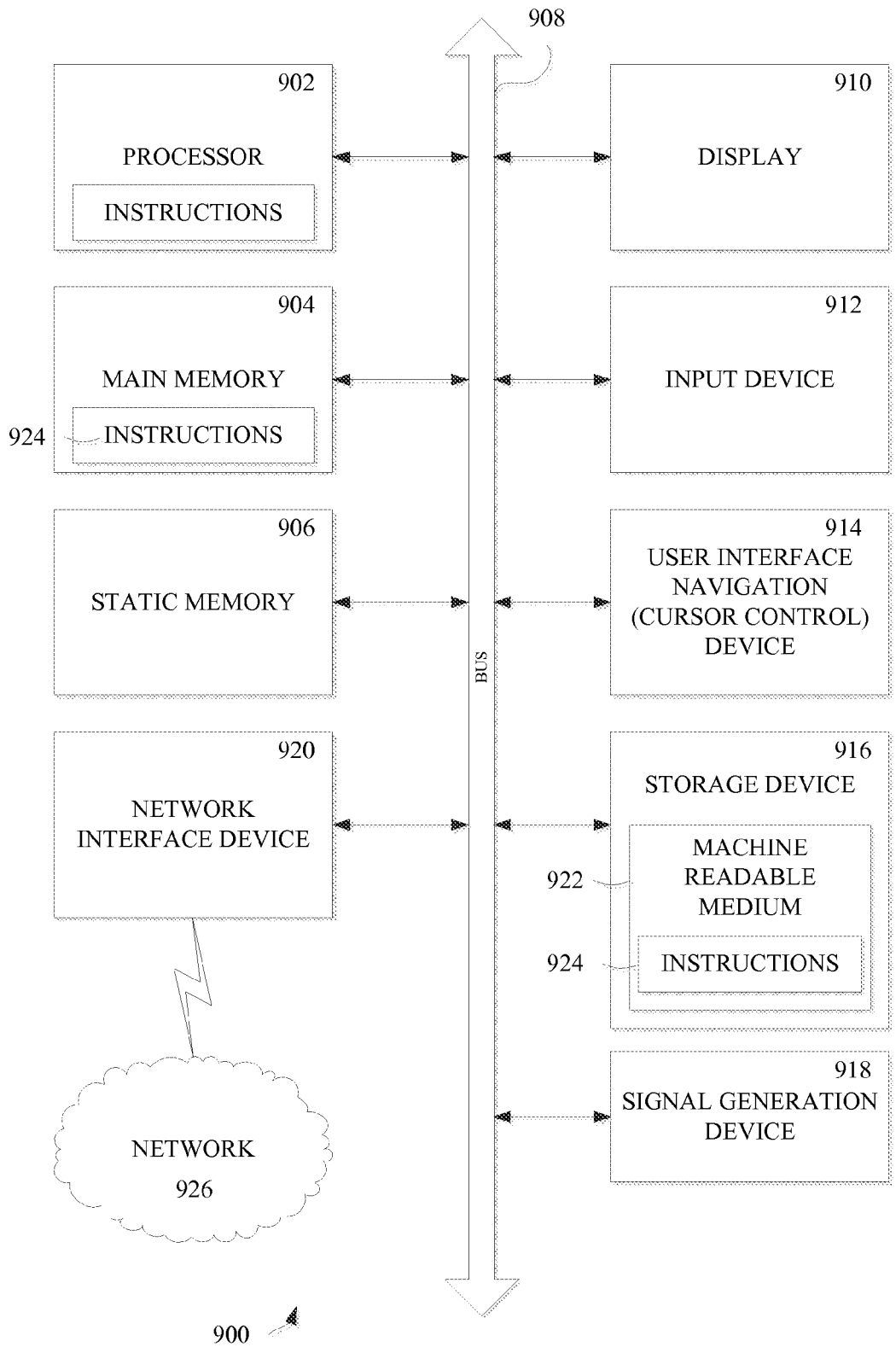
FIG. 9 is a diagrammatic representation of a machine in the example form of a computer system within which a set of instructions, for causing the machine to perform any one or more of the methodologies discussed herein, may be executed.

FIG. 9 is a diagrammatic representation of a machine in the example form of a computer system 900 within which a set of instructions 924, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions 924 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a cursor control device), a storage device 916, a signal generation device 918 (e.g., a speaker) and a network interface device 920.

The storage device 916 includes a machine-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

The instructions 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions e.g., 924. The term "machine-readable medium" shall also be taken to include any medium that is capable of storing and encoding a set of instructions e.g., 924 for execution by the machine and that cause the machine to perform any one or more of the methodologies of embodiments of the present disclosure, or that is capable of storing and encoding data structures utilized by or associated with such a set of instructions e.g., 924. The term "machine-readable medium" shall accordingly be taken to include, but not be limited to, solid-state memories, optical and magnetic media. Such media may, without limitation, also include hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "disclosure" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to provide reputation scores for a social network member has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method comprising:
for each of a plurality of possible presented actions corresponding to a particular flow of actions in a computer network, and for each of one or more possible performed actions for each possible presented action, determining a likelihood that a user will perform the possible performed action;
weighting each of the determined likelihoods by applying a weight assigned to a corresponding possible presented action;
identifying an optimum presented action by determining a presented action having a weighted maximum determined likelihood, based on the weighted determined likelihood, wherein the identifying an optimum presented action includes utilizing a machine learning model having one or more user covariates, one or more performed action covariates, one or more contextual flow covariates, and interactions between at least two of the one or more user covariates, one or more performed action covariates, and one or more contextual flow covariates as input, the user covariates including information specific to the user, the one or more performed action covariates including information specific to each of the possible performed actions, the contextual flow covariates including information specific to the particular flow of actions; and
presenting the optimum presented action to the user in response to the particular flow of actions in the computer network.

2. The method of claim 1, wherein the possible presented actions include web pages to which to redirect the user.

3. The method of claim 2, wherein the web pages are located in a social network site to which the user is a member.

4. The method of claim 1, wherein the one or more user covariates include demographic information about the user.

5. The method of claim 1, wherein the one or more user covariates include profile information about the user.

6. The method of claim 1, wherein the one or more user covariates include prior user actions.

7. A computer-implemented system comprising:
a processor;
a response prediction system executable by the processor and configured to:
for each of a plurality of possible presented actions corresponding to a particular flow of actions in a computer network, and for each of one or more possible performed actions for each possible presented action, determine a likelihood that a user will perform the possible performed action;
weight each of the determined likelihoods by applying a weight assigned to a corresponding possible presented action;
identify an optimum presented action by determining a presented action having a weighted maximum determined likelihood, based on the weighted determined likelihood, wherein the identifying an optimum presented action includes utilizing a machine learning model having one or more user covariates, one or more performed action covariates, one or more contextual flow covariates, and interactions between at least two of the one or more user covariates, one or more performed action covariates, and one or more contextual flow covariates as input, the user covariates including information specific to the user, the one or more performed action covariates including information specific to each of the possible performed actions, the contextual flow covariates including information specific to the particular flow of actions; and
an online social network system executable by the processor and configured to:
present the optimum presented action to the user in response to the particular flow of actions in the computer network.

8. The system of claim 7, wherein the determining a likelihood utilizes a machine learning model taking input about the user from the online social network system.

9. The system of claim 7, wherein the determining a likelihood utilizes a machine learning model taking outside input about the user from outside the online social network system, the outside input containing information not known to the online social network system.

10. A non-transitory machine-readable storage medium having instruction data to cause a machine to perform the following operations:
for each of a plurality of possible presented actions corresponding to a particular flow of actions in a computer network, and for each of one or more possible performed actions for each possible presented action, determining a likelihood that a user will perform the possible performed action;
weighting each of the determined likelihoods by applying a weight assigned to a corresponding possible presented action;
identifying an optimum presented action by determining a presented action having a weighted maximum determined likelihood, based on the weighted determined likelihood, wherein the identifying an optimum presented action includes utilizing a machine learning model having one or more user covariates, one or more performed action covariates, one or more contextual flow covariates, and interactions between at least two of the one or more user covariates, one or more performed action covariates, and one or more contextual flow covariates as input, the user covariates including information specific to the user, the one or more performed action covariates including information specific to each of the possible performed actions, the contextual flow covariates including information specific to the particular flow of actions; and presenting the optimum presented action to the user in response to the particular flow of actions in the computer network.

11. The non-transitory machine-readable storage medium of claim 10, wherein the possible presented actions include web pages to which to redirect the user.

12. The non-transitory machine-readable storage medium of claim 11 wherein the web pages are located in a social network site to which the user is a member.

13. The non-transitory machine-readable storage medium of claim 10, wherein the one or more user covariates include demographic information about the user.

14. The non-transitory machine-readable storage medium of claim 10, wherein the one or more user covariates include profile information about the user.

* * * * *